(12) United States Patent
Sugai

(10) Patent No.: US 9,771,100 B2
(45) Date of Patent: Sep. 26, 2017

(54) CONTROL DEVICE FOR STEER-BY-WIRE STEERING MECHANISM

(71) Applicant: NTN CORPORATION, Osaka (JP)

(72) Inventor: Tomohiro Sugai, Iwata (JP)

(73) Assignee: NTN CORPORATION, Osaka (JP)

( * ) Notice: Subject to any disclaimer, the term of this patent is extended or adjusted under 35 U.S.C. 154(b) by 35 days.

(21) Appl. No.: 14/383,181

(22) PCT Filed: Feb. 26, 2013

(86) PCT No.: PCT/JP2013/054880
§ 371 (c)(1),
(2) Date: Sep. 5, 2014

(87) PCT Pub. No.: WO2013/133080
PCT Pub. Date: Sep. 12, 2013

(65) Prior Publication Data
US 2015/0012183 A1    Jan. 8, 2015

(30) Foreign Application Priority Data

Mar. 9, 2012    (JP) ................. 2012-052439

(51) Int. Cl.
*B62D 6/00* (2006.01)
*B60G 17/016* (2006.01)
(Continued)

(52) U.S. Cl.
CPC .......... *B62D 6/002* (2013.01); *B60G 17/018* (2013.01); *B60G 17/0161* (2013.01);
(Continued)

(58) Field of Classification Search
CPC ........ B62D 6/002; B62D 6/003; B62D 6/005; B62D 6/006; B62D 6/008; B60W 30/02;
(Continued)

(56) References Cited

U.S. PATENT DOCUMENTS 4,794,539 A * 12/1988 Wallentowitz ........ B60T 8/1755
303/140
5,058,018 A * 10/1991 Kuwana ................ B60T 8/1764
303/149

(Continued)

FOREIGN PATENT DOCUMENTS

EP    1 125 826 A2    8/2001
EP    1 145 936 A1    10/2001
(Continued)

OTHER PUBLICATIONS

English Translation for JP 05-077626 (application JP 03-143733).*
(Continued)

*Primary Examiner* — John R Olszewski
*Assistant Examiner* — Tommy Worden

(57) ABSTRACT

Provided is a control device for a steer-by-wire steering mechanism, the control device including: a tire lateral force detection unit configured to detect tire lateral forces acting on left and right wheels; and a toe angle control unit configured to control toe angles of left and right wheels independently of each other such that the detected tire lateral forces become target lateral forces. Not during deceleration, the toe angle control unit sets target lateral forces FLt and FRt such that the total sum of the left and right target lateral forces is not changed and the total sum of absolute values thereof is decreased, and during deceleration, the toe angle control unit sets the target lateral forces FLt and FRt such that straight traveling stability can be obtained.

5 Claims, 4 Drawing Sheets

(51) Int. Cl.
*B60G 17/018* (2006.01)
*B62D 5/04* (2006.01)

(52) U.S. Cl.
CPC ......... *B60G 17/0164* (2013.01); *B62D 5/046* (2013.01); *B62D 6/001* (2013.01); *B62D 6/006* (2013.01); *B60G 2200/4622* (2013.01); *B60G 2400/208* (2013.01); *B60G 2400/41* (2013.01); *B60G 2400/64* (2013.01); *B60G 2500/40* (2013.01)

(58) Field of Classification Search
CPC .. B60W 40/06; B60W 40/064; B60W 40/068; B60W 40/10; B60W 40/101; B60W 40/105; B60W 40/109; B60W 40/114; B60W 40/1307; B60T 8/172; B60T 8/1725; B60T 8/1755; B60T 8/17551; B60T 8/17552; B60T 8/176; B60T 8/1761; B60T 8/1763; B60T 8/1764; B60T 2210/12; B60T 2210/124; B60T 2260/02; B60T 2260/022; B60T 2260/024
See application file for complete search history.

(56) References Cited

U.S. PATENT DOCUMENTS

| | | | | |
|---|---|---|---|---|
| 5,143,400 | A * | 9/1992 | Miller | B62D 17/00 180/413 |
| 5,263,548 | A * | 11/1993 | Tsuyama | B60K 28/16 180/197 |
| 5,286,098 | A * | 2/1994 | Okubo | B60T 8/1755 303/148 |
| 5,559,698 | A * | 9/1996 | Hwang | B60G 17/0195 180/197 |
| 6,184,637 | B1 * | 2/2001 | Yamawaki | B62D 5/0466 318/432 |
| 6,349,789 | B1 * | 2/2002 | Nakano | B60T 8/1755 180/443 |
| 6,453,226 | B1 * | 9/2002 | Hac | B60T 8/1755 180/41 |
| 6,678,596 | B2 * | 1/2004 | Husain | B62D 6/008 701/41 |
| 6,691,009 | B1 * | 2/2004 | Yao | B62D 6/002 180/402 |
| 6,719,087 | B2 | 4/2004 | Demerly | |
| 6,782,968 | B2 * | 8/2004 | Sakugawa | B62D 5/008 180/443 |
| 6,808,041 | B2 | 10/2004 | Demerly | |
| 7,740,102 | B2 * | 6/2010 | Tsukasaki | B62D 6/003 180/408 |
| 7,866,434 | B2 * | 1/2011 | Shiino | B60G 7/006 180/411 |
| 8,050,819 | B2 | 11/2011 | Suyama et al. | |
| 8,073,592 | B2 * | 12/2011 | Nishimori | B60G 7/003 180/404 |
| 8,583,328 | B2 | 11/2013 | Mori et al. | |
| 8,972,114 | B1 * | 3/2015 | Han | B62D 5/003 180/411 |
| 2001/0032748 | A1 | 10/2001 | Demerly | |
| 2002/0011093 | A1 * | 1/2002 | Matsuno | B60T 8/172 73/9 |
| 2002/0189889 | A1 | 12/2002 | Demerly | |
| 2003/0028308 | A1 * | 2/2003 | Ishikawa | B60T 8/1764 701/71 |
| 2004/0019423 | A1 * | 1/2004 | Yasui | B60T 8/17636 701/71 |
| 2004/0133324 | A1 * | 7/2004 | Yasui | B60T 8/172 701/41 |
| 2004/0148077 | A1 * | 7/2004 | Yasui | B60T 8/172 701/41 |
| 2008/0051941 | A1 * | 2/2008 | Horiuchi | B62D 7/148 700/279 |
| 2008/0054577 | A1 * | 3/2008 | Horiuchi | B62D 6/02 280/5.522 |
| 2008/0059022 | A1 * | 3/2008 | Shimodaira | B60L 11/1851 701/36 |
| 2008/0177442 | A1 | 7/2008 | Tsukasaki et al. | |
| 2008/0201037 | A1 | 8/2008 | Suyama et al. | |
| 2008/0243339 | A1 * | 10/2008 | Nishimori | B60G 7/003 701/41 |
| 2009/0057050 | A1 * | 3/2009 | Shiino | B60G 7/006 180/412 |
| 2010/0032921 | A1 * | 2/2010 | Nishigaya | B60G 3/10 280/124.176 |
| 2012/0059552 | A1 | 3/2012 | Mori et al. | |
| 2012/0097470 | A1 * | 4/2012 | Yamasaki | B62D 5/001 180/402 |
| 2014/0172236 | A1 * | 6/2014 | Nishikawa | B62D 6/00 701/42 |
| 2015/0012183 | A1 * | 1/2015 | Sugai | B62D 6/002 701/41 |
| 2015/0066304 | A1 * | 3/2015 | Han | B62D 5/003 701/43 |
| 2016/0121922 | A1 * | 5/2016 | Fujita | B62D 5/0448 74/89.39 |

FOREIGN PATENT DOCUMENTS

| | | | | |
|---|---|---|---|---|
| JP | 5-77626 | | 3/1993 | |
| JP | 2009-107459 | | 5/2009 | |
| JP | 2009-154574 | | 7/2009 | |
| JP | 2009-255918 | | 11/2009 | |
| JP | 2010-163041 | | 7/2010 | |
| JP | 2011-84178 | | 4/2011 | |
| JP | 2010-060809 | * | 6/2011 | ............... B62D 5/00 |
| JP | PCT/JP 2010-060809 | * | 6/2011 | ............... B62D 5/00 |
| JP | 2011-161938 | | 8/2011 | |
| JP | 4740360 | | 8/2011 | |
| WO | WO 2010/128585 A1 | | 11/2010 | |

OTHER PUBLICATIONS

English Translation for JP 2009-154574 (application JP 2007-332102).*
English translation for JP 2010-060809, combined with the Japanese version.*
English translation for PCT/JP 2010-060809, based on the Japanese version.*
PCT International Preliminary Report on Patentability mailed Sep. 18, 2014 in corresponding International Patent Application No. PCT/JP2013/054880.
Japanese Office Action dated Jul. 7, 2015 in corresponding Japanese Patent Application No. 2012-052439.
International Search Report mailed Apr. 2, 2013, in corresponding International Patent Application No. PCT/JP2013/054880.
Extended European Search Report dated Mar. 14, 2016 in corresponding European Patent Application No. 13757953.8.
Chinese Office Action dated Oct. 27, 2015 in corresponding Chinese Patent Application No. 201380012398.4.

* cited by examiner

CONTROL DEVICE FOR STEER-BY-WIRE STEERING MECHANISM

CROSS-REFERENCE TO RELATED APPLICATIONS

This application is a U.S. National Stage Application under 35 U.S.C. 371 of International Patent Application No. PCT/JP2013/054880, filed Feb. 26, 2013, which is based on and claims foreign priority benefit of Japanese Patent Application No. 2012-052439, filed Mar. 9, 2012, in the Japanese Patent Office, the entire disclosures of which are herein incorporated by reference as a part of this application.

BACKGROUND OF THE INVENTION (Field of the Invention)

The present invention relates to a steer-by-wire steering device configured to perform steering by use of a steering wheel which is mechanically unconnected with a shaft between tie rods, the shaft being for performing turning. In particular, the present invention relates to a control device for a steer-by-wire steering mechanism configured to perform toe angle control, in a steer-by-wire steering device including a toe angle control mechanism.

(Description of Related Art)

A toe angle of wheels of a vehicle at the time of shipment from a factory is set in consideration of traveling stability. However, such a setting of the toe angle is not a setting that realizes optimum fuel efficiency. For example, when the toe angle is set to be toe-in, due to a rearward component of lateral force acting on the wheels, travel resistance increases and the fuel efficiency decreases.

There has been proposed a method for improving the fuel efficiency by controlling alignment of wheels such as the toe angle in accordance with a traveling state (for example, Patent Document 1). However, in order to control the toe angle in accordance with a traveling state, as disclosed in Patent Document 1 above, the toe angles of the left and right wheels need to be controlled independently of each other. Therefore, for example, when the steering mechanism of the vehicle is connected to the left and right wheels, the toe angle cannot be changed.

As another technology for improving the fuel efficiency, there has been proposed a technology in which the toe angle is set to "0" during accelerating or constant-speed travel, to improve the fuel efficiency of the vehicle traveling straight, and a toe angle in a toe-in direction is provided during decelerating travel, to ensure the vehicle stability (for example, Patent Document 2).

As a method for determining wheel alignment that realizes the best fuel efficiency, there has been proposed a method in which wheel alignment that makes the speed decreasing rate lowest when the vehicle is traveling straight in a state no braking and driving force is being generated is determined as wheel alignment appropriate for the vehicle traveling straight (for example, Patent Document 3). As still another technology for improving the fuel efficiency, there has been proposed a method in which the fuel efficiency is calculated from a fuel injection amount and a travel distance, and wheel alignment that realizes the best fuel efficiency is stored (for example, Patent Document 4).

PRIOR ART DOCUMENT

Patent Document

[Patent Document 1] JP Laid-Open Patent Publication No. 2011-084178

[Patent Document 2] JP Laid-Open Patent Publication No. H05-077626

[Patent Document 3] JP Laid-Open Patent Publication No. 2010-163041

[Patent Document 4] JP Patent No. 4740360

SUMMARY OF THE INVENTION

In the technology disclosed in Patent Document 2, a toe angle is calculated from the stroke amount of a rod of an actuator which drives a toe angle changing device, and control is performed such that the calculated toe angle becomes "0". Thus, there are cases where, for example, due to discrepancy (error) and the like between the stroke amount of the rod of the actuator and the actual toe angle, the toe angle cannot be accurately set to "0". In such a case, even when the actuator is controlled such that the calculated value of the toe angle becomes "0", the actual toe angle cannot be set to "0", and thus, the vehicle traveling straight cannot travel at the best fuel efficiency. Moreover, when a toe angle set in advance is provided during decelerating travel, the straight traveling stability may vary due to the state of the road surface and the like.

In the method disclosed in Patent Document 3, under the influence of the state of the road surface, an inclination of the traveling path, wind outside the vehicle, and the like, the toe angle may not be necessarily set to a value that realizes the best fuel efficiency. Moreover, this method can be applied only when the vehicle is traveling straight, and cannot be applied when the vehicle is turning.

The method disclosed in Patent Document 4 requires a navigation device which obtains current position information and road information, and thus, requires high costs. Moreover, also due to influence such as wind outside the vehicle, the fuel efficiency varies, and thus, the toe angle may not be necessarily set to a value that realizes the best fuel efficiency.

An object of the present invention is to provide a control device for a steer-by-wire steering mechanism, the control device capable of setting, during acceleration and during constant speed travel, toe angles that realize the best fuel efficiency without being affected by discrepancy between the stroke amount of a turning shaft and actual toe angles, an inclination of the traveling path, the state of the road surface, wind outside the vehicle, and the like, and capable of allowing travel at the best fuel efficiency.

In order to facilitate understanding, reference numerals in the embodiment below are used in the description. A control device configured to perform control for a steer-by-wire steering mechanism of the present invention, the steer-by-wire steering mechanism including: a steering wheel 1 mechanically unconnected with a turning shaft 10, the turning shaft 10 configured to turn wheels 13 and change toe angles of the wheels 13; a steering angle sensor 2 configured to detect a steering angle of the steering wheel 1; a turning motor 15 configured to cause the turning shaft 10 to perform turning operation; and a toe angle controlling motor 16 configured to cause the turning shaft 10 to perform toe angle changing operation, the control device configured to control the turning motor 15 based on a traveling state and a steering angle detected by the steering angle sensor 2 and configured to control the toe angle controlling motor 16 based on the traveling state, the control device including: a tire lateral force detection unit 41 configured to detect tire lateral forces acting on left and right wheels 13; and a toe angle control unit 6 configured to control toe angles of the left and right wheels 13 independently of each other such that the detected tire lateral forces become target lateral forces.

According to this configuration, the toe angle control unit 6 controls the toe angles of the left and right wheels 13 independently of each other. Thus, control can be performed in accordance with the traveling state, such that the toe angles of the left and right wheels 13 respectively become appropriate angles so as to decrease travel resistance caused by rearward components of lateral forces occurring on the tires, whereby the fuel efficiency can be stabilized. In this case, the tire lateral forces acting on the left and right wheels 13 are detected by the tire lateral force detection unit 41 and the toe angles of the left and right wheels 13 are controlled such that the detected tire lateral forces become target lateral forces. That is, not the detected values of the toe angles but the tire lateral forces generated as a result of control of the toe angles are used in feedback control. Accordingly, without being affected by discrepancy (i.e., error) between the stroke amount of the turning shaft 10 and the actual toe angles, an inclination of the traveling path, the state of the road surface, wind outside the vehicle, and the like, adjustment to target lateral forces can be realized. The toe angle control using the detected values of the tire lateral forces is appropriate during acceleration using the drive by a travel drive source, or during constant speed travel.

As described above, during acceleration, and during constant speed travel, without being affected by discrepancy between the stroke amount of the turning shaft and the actual toe angles, an inclination of the traveling path, the state of the road surface, wind outside the vehicle, and the like, the toe angles can be set to values that realize the best fuel efficiency, and thus, travel at the best fuel efficiency can be realized.

It should be noted that during deceleration, by determining and using target lateral forces as described later, optimum straight traveling stability can be obtained without being affected by discrepancy between the stroke amount of the turning shaft 10 and the actual toe angles, the state of the road surface, and the like.

The tire lateral force detection unit 41 may be load sensors 41 respectively provided at the left and right wheels. Providing the load sensors 41 at the wheels 13 means providing the load sensors 41 to the wheels 13 so as to be able to detect loads acting on the wheels 13. For example, the load sensors 41 may be provided at wheel bearings.

By use of the load sensors 41, it is possible to accurately detect tire lateral forces acting on the wheels 13. Further, as a load sensor capable of detecting tire lateral force, various types of the load sensor configured to be provided at a wheel bearing or the like have been developed.

In one embodiment of the present invention, the toe angle control unit 6 may include a target lateral force calculation output section 20 configured to calculate and output target lateral forces such that, when the tire lateral forces of the left and right wheels 13 are in opposite directions to each other, the tire lateral force acting on one of the wheels 13 that has the smaller of absolute values of the tire lateral forces becomes 0, and the tire lateral force acting on the other of the wheels 13 becomes a sum of the tire lateral forces acting on the left and right wheels 13, and the toe angle control unit 6 may be configured to control the toe angles of the left and right wheels 13 such that the tire lateral forces detected by the tire lateral force detection unit 41 become the target lateral forces calculated by the target lateral force calculation output section 20.

In the case of this configuration, the tire lateral forces of the left and right wheels 13 are obtained from the tire lateral force detection unit 41 being the load sensors 41 provided at the left and right wheels 13. When the directions of the tire lateral forces are opposite to each other, the toe angles of the left and right wheels 13 are controlled such that the lateral force acting on the tire having the smaller of absolute values of the lateral forces is made 0 and a decreased lateral force is cause to be generated at the other tire. That is, the absolute value of the lateral force generated by the other tire is decreased. Accordingly, the total sum of the lateral forces generated by the tires of the left and right wheels 13 is not changed, and the total sum the absolute values of the lateral forces generated by the tires of the left and right wheels 13 can be decreased. Accordingly, travel resistance caused by rearward components of the lateral forces can be decreased, and thus, the fuel efficiency can be improved. Moreover, this control does not require a storage device for storing a large amount of information, and thus, the control device can be simplified.

The toe angle control unit 6 may use the target lateral forces calculated and outputted by the target lateral force calculation output section 20, in toe angle control during acceleration in which driving force is required or during constant speed travel, and may not use the target lateral forces in toe angle control during other travel states, such as during deceleration and during acceleration due to gravity in a long downslope. It should be noted that the above-mentioned "during acceleration in which driving force is required" means acceleration in which driving force from a travel drive source is required for the acceleration.

This toe angle control is performed in order to improve the fuel efficiency, and thus, it is preferable to conduct the above control during acceleration in which driving force is required or during constant speed travel, in terms of realizing actual effect of improvement of the fuel efficiency.

In one embodiment of the present invention, the toe angle control unit 6 may include a decelerating-time target lateral force output section 21 configured to output, as target lateral forces, target lateral forces set as appropriate so as to realize optimum straight traveling stability, or target lateral forces calculated in accordance with a deceleration degree, the target lateral forces to be used in toe angle control during decelerating travel.

During deceleration, improvement of straight traveling stability is prioritized. Thus, in terms of improvement of straight traveling stability, it is preferable to control toe angles so as to be lateral forces set in advance or target lateral forces calculated in accordance with a deceleration degree. Also in this case, not the toe angles but the lateral forces are feedback-controlled, whereby without being affected by discrepancy between the stroke amount of the turning shaft and the actual toe angles, the state of the road surface, and the like, optimum straight traveling stability can be obtained.

In this case, in toe angle control using the target lateral forces outputted from the decelerating-time target lateral force output section 21, the toe angle control unit 6 may set the toe angles increasingly toward toe-in sides in accordance with increase of the deceleration degree. By setting the toe angles increasingly toward toe-in sides, tire force is increased but straight traveling stability is improved.

The present invention encompasses any combination of at least two constructions disclosed in the claims, the specification and/or the drawings. In particular, the present invention encompasses any combination of at least two claims.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
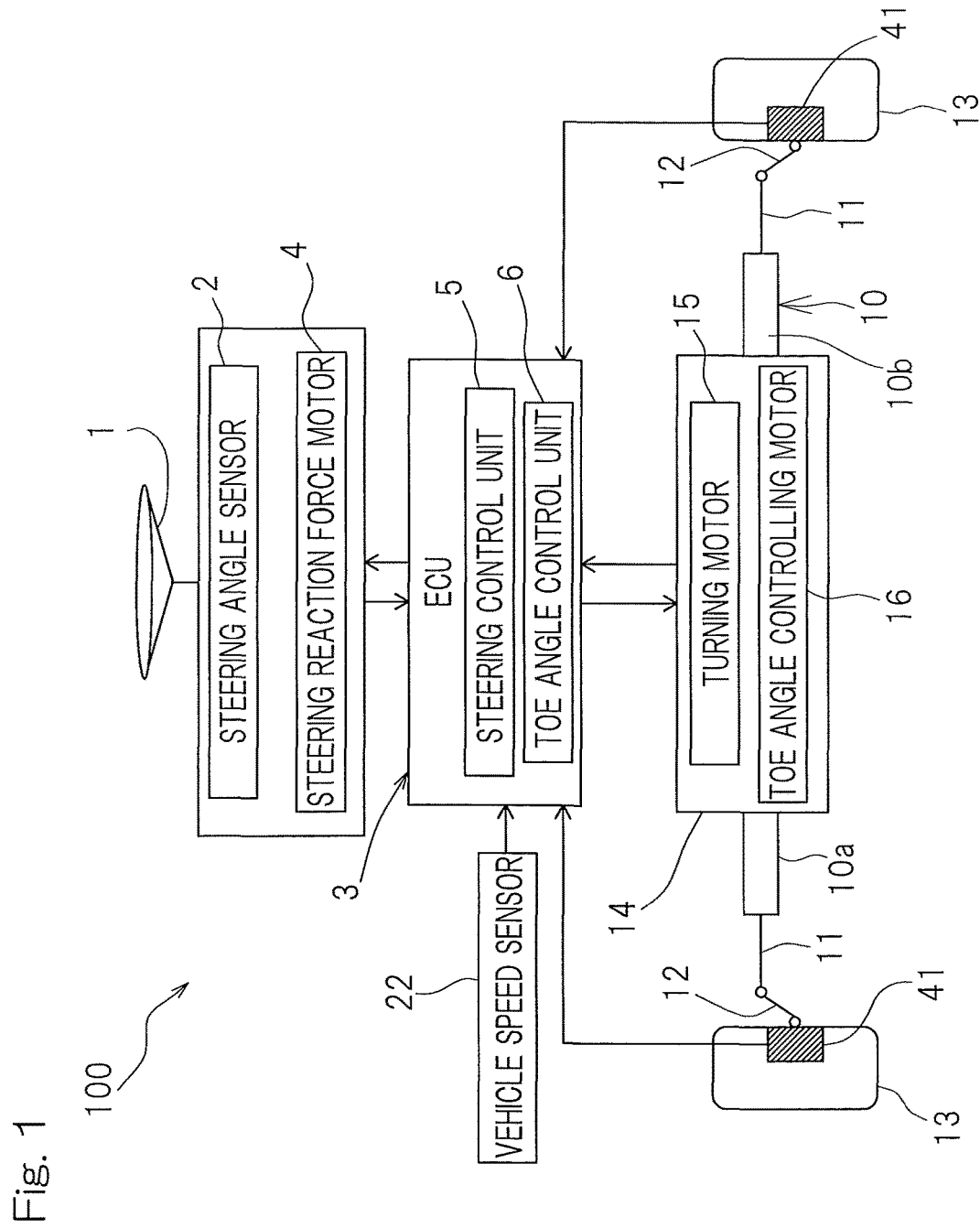
FIG. 1 is a diagram showing a configuration of a concept of a steer-by-wire steering mechanism including a control device according to one embodiment of the present invention.

One embodiment of the present invention will be described with reference to FIG. 1 to FIG. 3. FIG. 1 shows a schematic configuration of a steer-by-wire steering device and a control device therefor. The steer-by-wire steering device 100 includes a steering wheel 1, called a handle, to be steered by a driver; a steering angle sensor 2, a steering reaction force motor 4, a turning shaft 10 (also referred to as a "shaft between tie rods") movable in an axial direction for performing turning, which is connected to left and right wheels 13 being steered wheels, via knuckle arms 12 and tie rods 11, and a turning shaft driving mechanism 14 configured to drive the turning shaft 10.

The steering wheel 1 is mechanically unconnected with the turning shaft 10, and is configured to control a turning motor 15 of the turning shaft driving mechanism 14 via a steering control unit 5, to cause turning operation. The turning shaft driving mechanism 14 has a function of converting rotary motion of the turning motor 15 into reciprocating rectilinear motion to cause the turning shaft 10 to advance and retract, and a function of changing the length of the turning shaft 10 through rotary motion of a toe angle controlling motor 16 to change the interval between the tie rods 11. The turning shaft 10 has a two-piece construction made up of left and right split shafts 10a and 10b which are partially fitted to each other, with one externally fitted to the other. Accordingly, the length of the turning shaft 10 can be changed by adjusting the length of the fitted portion of the split shafts 10a and 10b. By this length changing, adjustment of the toe angles is performed, and turning is performed by axial movement in which the split shafts 10a and 10b move together with each other. By combining the axial movement with the length adjustment of the turning shaft 10, independent toe angle adjustments of the left and right wheels 13, i.e., adjustments of toe angles having different angles from each other, can be performed. The steering reaction force motor 4 is a drive source configured to apply a steering reaction force torque on the steering wheel 1. The steering angle sensor 2 is a sensor configured to detect a steering angle of the steering wheel 1, and may be composed of a resolver, an optical or magnetic encoder, or the like.

The steering control unit 5 is provided as a part of a main ECU (electronic control unit) 3 configured to control the entirety of the vehicle, or as another electronic control unit different from the main ECU 3. The steering control unit 5 is a unit configured to cause the turning shaft 10 to perform turning operation, by controlling the turning motor 15 based on a traveling state and a steering angle detected by the steering angle sensor 2. The steering control unit 5 includes a controller (not shown) configured to control the turning motor 15 and the steering reaction force motor 4. As another part of the ECU 3, a toe angle control unit 6 is provided. The toe angle control unit 6 is a unit configured to cause the turning shaft 10 to perform toe angle changing operation, by controlling the toe angle controlling motor 16 of the turning shaft driving mechanism 14 based on the traveling state. Each of the ECU 3 and the another electronic control unit includes a microcomputer, an electronic circuit including a control program therefor, and the like.

The left and right wheels 13 are respectively provided with load sensors 41 which serve as a tire lateral force detection unit configured to detect tire lateral forces acting on these wheels 13. Tire lateral forces acting on the left and right wheels 13 detected by the load sensors 41 are to be used in toe angle control performed by the toe angle control unit 6. The steering control unit 5, the toe angle control unit 6, and the load sensors 41 form the control device of the present embodiment. The tire lateral force detection unit is not limited to the load sensors 41 provided at the left and right wheels 13 as in this example, but may employ other instruments.

Figure 2:
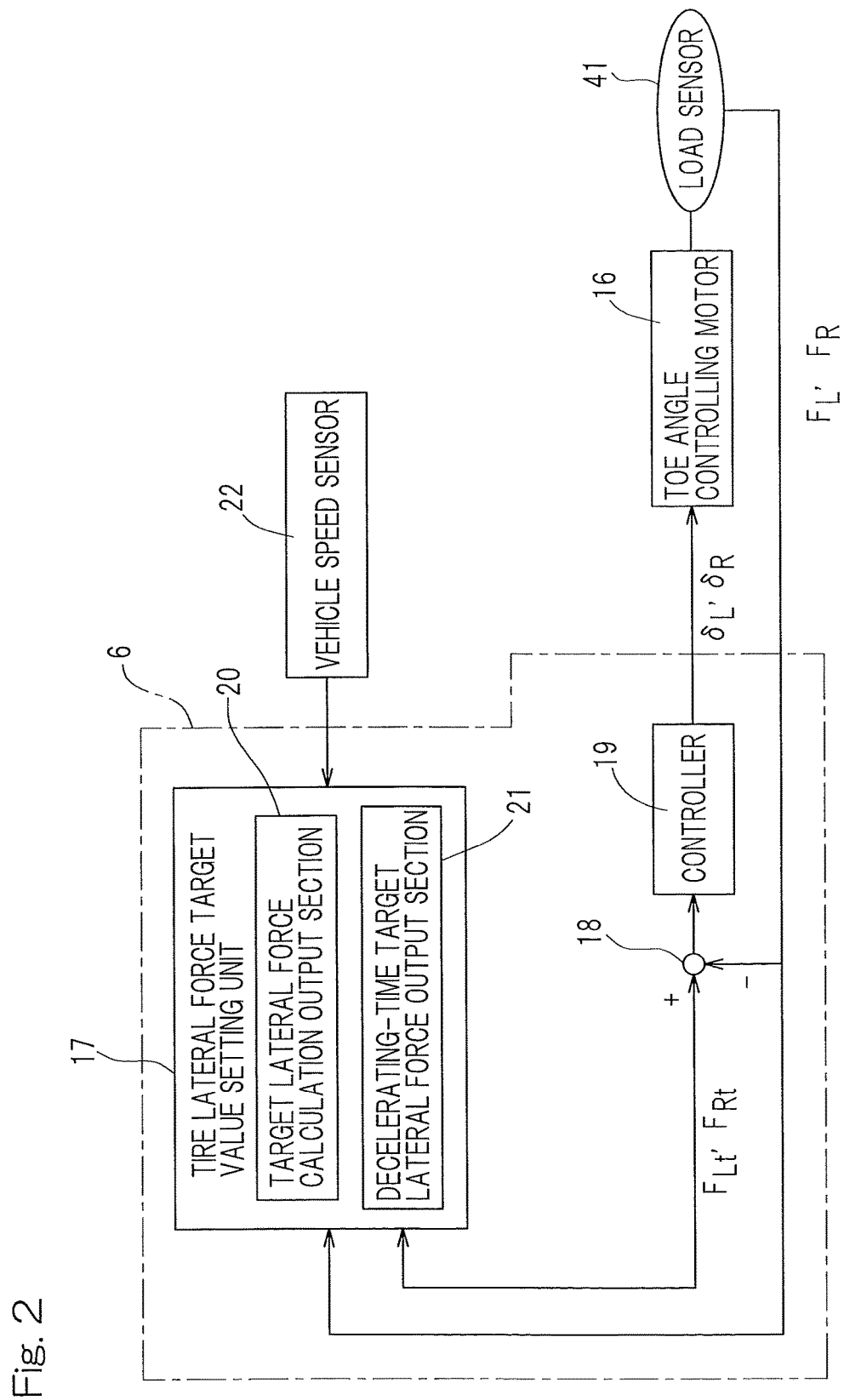
FIG. 2 is a block diagram showing a configuration of a concept of a toe angle control unit in the control device of the steer-by-wire steering mechanism.

FIG. 2 is a block diagram showing a configuration of a concept of the toe angle control unit 6. The outline is as follows. Tire lateral forces of the left and right wheels are detected by the load sensors 41, and the toe angles of the left and right wheels are controlled such that the tire lateral forces of the left and right wheels become target values. Specifically, the toe angle control unit 6 includes: a tire lateral force target value setting unit 17 configured to set tire target values FLt and FRt to be used in toe angle control; a comparator 18 configured to compare the tire lateral force target values FLt and FRt set by the tire lateral force target value setting unit 17 with tire lateral forces FL and FR detected by the load sensors 41; and a controller 19 configured to perform feedback control by providing correction commands δL and δR to the toe angle controlling motor 16 in accordance with the comparison result obtained by the comparator 18.

The tire lateral force target value setting unit 17 includes a target lateral force calculation output section 20, and a decelerating-time target lateral force output section 21. The target lateral force calculation output section 20 is configured to calculate and output the tire lateral force target values FLt and FRt, such that, when the tire lateral forces FL and FR acting on the left and right wheels 13 detected by the load sensors 41 are in opposite directions to each other, the tire lateral force acting on one of the wheels 13 that has the smaller of absolute values of the tire lateral forces FL and FR becomes "0", and the tire lateral force acting on the other of the wheels 13 becomes the sum of the tire lateral forces FL and FR acting on the left and right wheels 13. The tire lateral force target values FLt and FRt calculated and outputted by the target lateral force calculation output section 20 are to be used in toe angle control during acceleration in which the vehicle requires driving force or during constant speed travel.

The decelerating-time target lateral force output section 21 outputs, as the tire lateral force target values FLt and FRt to be used in toe angle control during decelerating travel of the vehicle, target lateral forces set in advance so as to realize optimum straight traveling stability, or target lateral forces calculated in accordance with a deceleration degree. Each "target lateral force set in advance" may be determined based on the design or experiments and set in the decelerating-time target lateral force output section 21 prior to the actual use of the vehicle. During decelerating travel when the target lateral forces are used, the toe angle control unit 6 performs control so as to set the toe angles increasingly toward toe-in sides in accordance with increase of the deceleration degree. To the toe angle control unit 6, as information regarding a vehicle traveling state to be used in the control, vehicle speed information detected by a vehicle speed sensor 22 is inputted.

Figure 3:
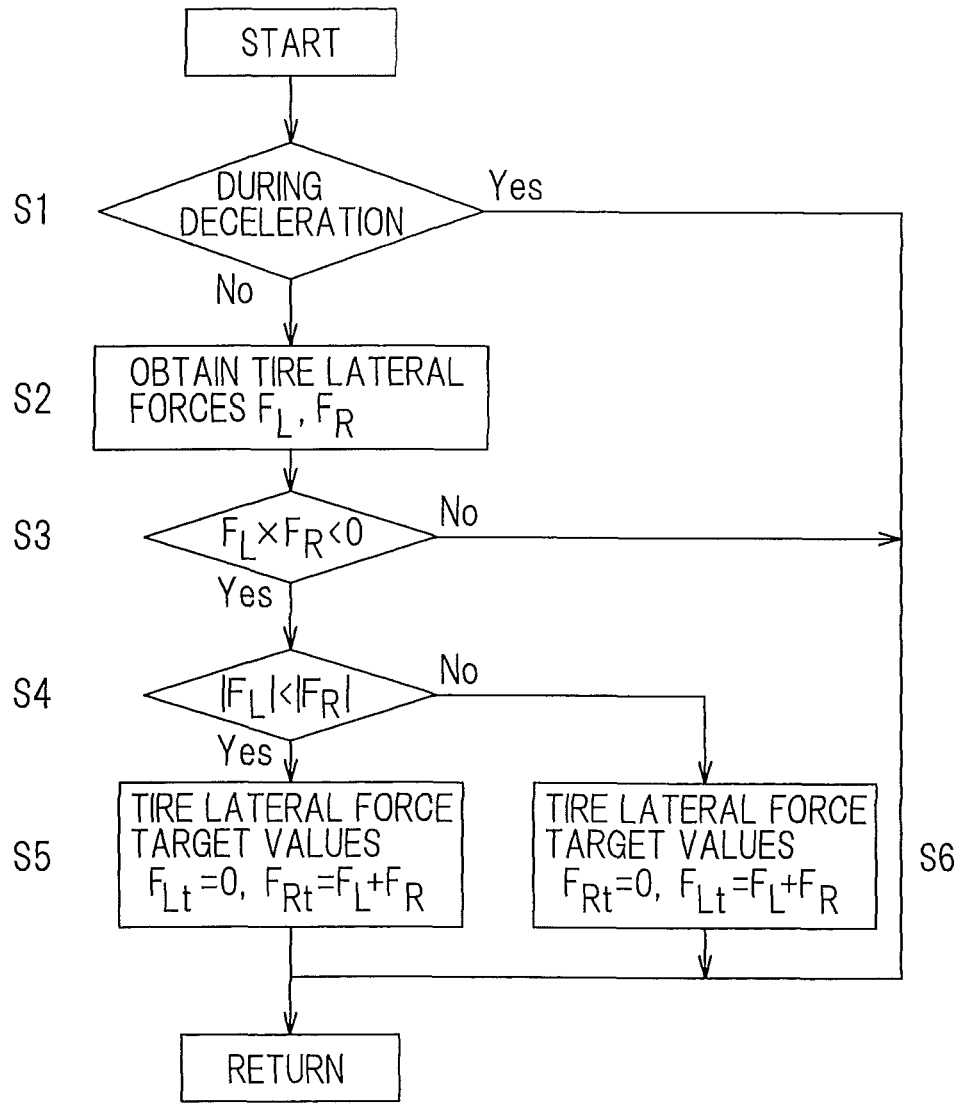
FIG. 3 is a flowchart of a calculation process of target lateral force performed in the toe angle control unit.

FIG. 3 is a flowchart of a calculation process performed when the target lateral force calculation output section 20 of the toe angle control unit 6 calculates and outputs the tire lateral force target values FLt and FRt. With reference to the flowchart, the outline of the calculation process will be described below. Not during deceleration, i.e., during acceleration in which the vehicle requires driving force from a travel drive source (not shown) or during constant speed travel (step S1), the target lateral force calculation output section 20 obtains the tire lateral forces FL and FR acting on the left and right wheels 13, from the load sensors 41 provided at the left and right the wheels 13 (step S2). When the directions of the tire lateral forces are opposite to each other (step S3), the target value of the tire lateral force acting on one of the wheels 13 that has the smaller of absolute values of the tire lateral forces FL and FR is set to "0", and the target value of the tire lateral force acting on the other of the wheels 13 is set to the sum FL+FR of the tire lateral forces of the left and right wheels 13 (steps S4, S5). That is, the absolute value of the tire lateral force acting on the other wheel 13 is decreased.

In the toe angle control during decelerating travel of the vehicle, tire lateral force target values are used which are set in the decelerating-time target lateral force output section 21 so as to realize appropriate straight traveling stability as described above.

Thus, through the toe angle control by the toe angle control unit 6 shown in FIG. 2, not during deceleration (during acceleration or during constant speed travel), the total sum of the tire lateral forces FL and FR acting on the left and right wheels 13 is not changed, and the total sum of the absolute values of the tire lateral forces FL and FR acting on the left and right wheels 13 can be decreased. Accordingly, travel resistance caused by rearward components of the tire lateral forces can be decreased, and the fuel efficiency can be improved. This control is performed during acceleration in which driving force is required or during constant speed travel.

As a result, without being affected by discrepancy (i.e., error) and the like between the stroke amount of the rod of the actuator and the actual toe angle as in conventional examples (for example, Patent Document 2), the toe angles can be set to values that realize the best fuel efficiency. Even when there is influence of an inclination of the traveling path, wind outside the vehicle, and the like, the toe angles can be controlled to be values that realize the minimum total sum of the tire lateral forces acting on the left and right wheels 13, and thus, travel at the best fuel efficiency can be realized. Moreover, the control device does not require a special storage device for toe angle control, and thus, the configuration of the control device can be simplified.

During decelerating travel of the vehicle, in order to improve straight traveling stability, the toe angles are set toward toe-in sides so as to realize the tire lateral force target values set in advance or the tire lateral force target values calculated in accordance with the deceleration degree. In the toe angle control unit 6 of this control device, not the toe angles but the tire lateral forces are feedback-controlled, whereby the toe angles are set. Thus, without being affected by discrepancy (error) between the stroke amount of the rod of the actuator and the actual toe angle, the state of the road surface, and the like as in conventional examples (for example, Patent Document 2), optimum straight traveling stability can be obtained.

The load sensors 41 in the above described embodiment may be mounted to, for example, wheel bearings of the left and right wheels 13 of the vehicle. One example of the wheel bearing with load sensors will be described with reference to FIGS. 4 and 5. This wheel bearing 31 includes a plurality of rows of rolling elements 53 interposed between an outer member 51 which is a stationary ring and an inner member 52 which is a rotating ring, and a vehicle body mounting flange 51a of the outer member 51 is mounted to a knuckle 55, and to a wheel mounting flange 52a of the inner member 52, a wheel (not shown in the FIGS. 4 and 5) is mounted. As shown in FIG. 5, the load sensors 41 are mounted at four positions, i.e., up, down, left, and right, of the outer periphery of the outer member 51. Each load sensor 41 may be a strain sensor which is mounted to the outer member 51 and directly detects strain of the outer member 51. Alternatively, each load sensor 41 may include a strain generator member (not shown) in contact with the outer member 51 at a plurality of positions (for example, two or three positions) thereof, and a strain sensor (not shown) affixed to this strain generator member, and may be configured such that the strain generator member is strained such that the strain thereof is increased by the strain of the outer member 51, whereby the load is detected from the strain of this strain generator member.

Figure 4:
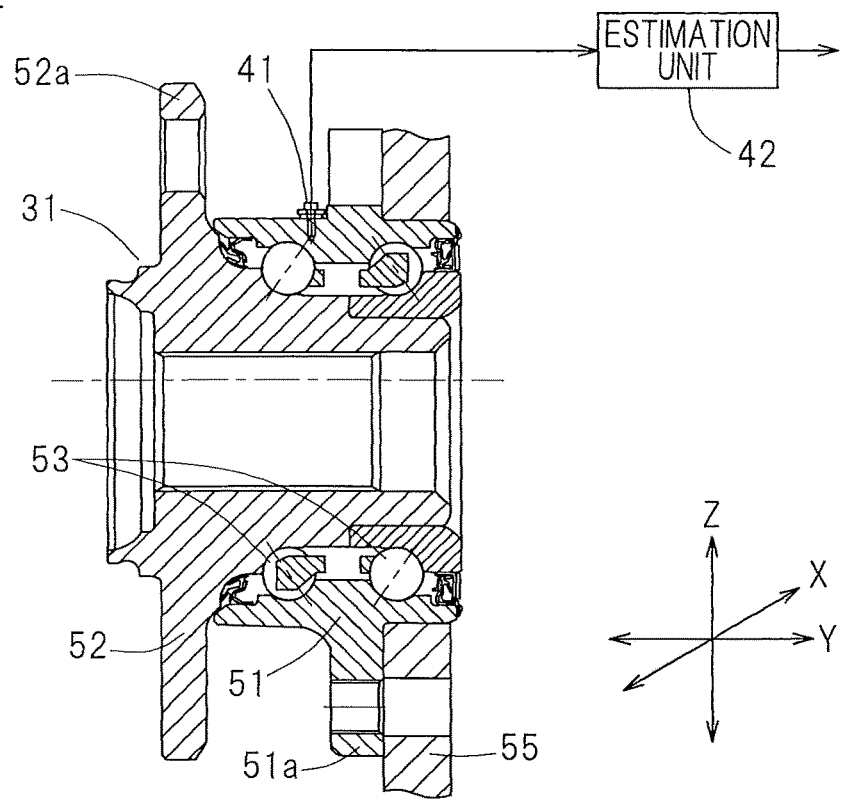
FIG. 4 is a cross-sectional view of a wheel bearing including a load sensor.
Figure 5:
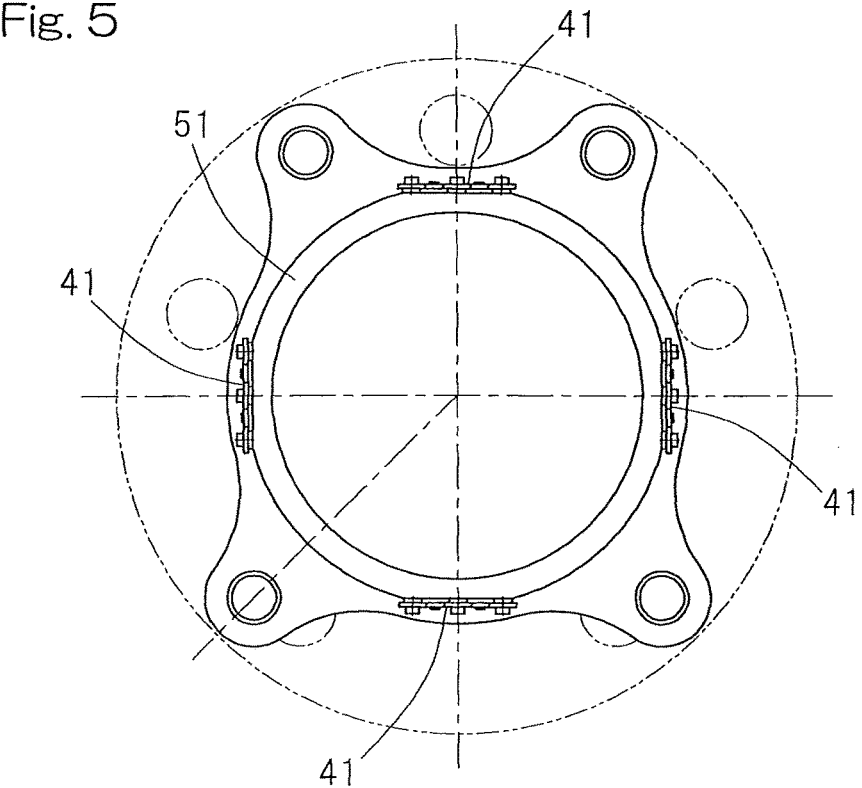
FIG. 5 is a side view of an outer member of the wheel bearing.

An estimation unit 42 shown in FIG. 4 calculates estimated values of the tire lateral forces FL and FR acting on the left and right wheels 13, based on values detected by the load sensors 41. The estimation unit 42 may be provided, for example, in the ECU 3 (FIG. 1) or as a dedicated electronic circuit.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Steering wheel
2 . . . Steering angle sensor
4 . . . Steering reaction force motor
5 . . . Steering control unit
6 . . . Toe angle control unit
10 . . . Turning shaft
13 . . . Wheel
15 . . . Turning motor
16 . . . Toe angle controlling motor
17 . . . Tire lateral force target value setting unit
20 . . . Target lateral force calculation output section
21 . . . Decelerating-time target lateral force output section
22 . . . Vehicle speed sensor 41 . . . Load sensor (Tire lateral force detection unit)
5, 6, 41 . . . Control device

What is claimed is:

1. A control device configured to perform control for a steer-by-wire steering mechanism which includes a steering wheel mechanically unconnected with a turning shaft, the turning shaft configured to turn wheels and change toe angles of the wheels; a steering angle sensor configured to detect a steering angle of the steering wheel; a turning motor configured to axially move the turning shaft to cause the turning shaft to perform a turning operation; and a toe angle controlling motor provided independently from the turning motor and configured to change a length of the turning shaft to cause the turning shaft to perform a toe angle changing operation, the control device comprising:
 a tire lateral force detection unit configured to detect tire lateral forces acting on left and right wheels; and
 a toe angle control unit configured to control toe angles of the left and right wheels independently of each other such that the detected tire lateral forces become target lateral forces,
 wherein the control device is configured to control the turning motor based on a traveling state and the steering angle detected by the steering angle sensor and configured to control the toe angle controlling motor based on the traveling state,
 wherein the toe angle control unit includes a target lateral force calculation output section configured to calculate and output target lateral forces,
 wherein the target lateral force calculation output section is configured to set to 0 the target tire lateral force acting on one of the wheels that has the smaller of absolute values of the tire lateral forces when the tire lateral forces acting on the left and right wheels are in opposite directions to each other, and to set a sum of the tire lateral forces acting on the left and right wheels the target tire lateral force acting on the other of the wheels, and
 wherein the toe angle control unit is configured to control the toe angles of the left and right wheels based on the target lateral forces as calculated and output by the target lateral force calculation output section.

2. The control device for the steer-by-wire steering mechanism as claimed in claim 1, wherein the tire lateral force detection unit includes load sensors respectively provided at the left and right wheels.

3. The control device for the steer-by-wire steering mechanism as claimed in claim 1, wherein the toe angle control unit uses the target lateral forces calculated and outputted by the target lateral force calculation output section, in toe angle control during acceleration in which driving force is required or during constant speed travel.

4. The control device for the steer-by-wire steering mechanism as claimed in claim 1, wherein the toe angle control unit includes a decelerating-time target lateral force output section configured to output, as target lateral forces, target lateral forces set so as to realize optimum straight traveling stability, or target lateral forces calculated in accordance with a deceleration degree, the target lateral forces to be used in toe angle control during decelerating travel, and wherein the toe angle control unit is configured to control the toe angles of the left and right wheels such that the tire lateral forces detected by the tire lateral force detection unit become target lateral forces calculated by the decelerating-time target lateral force output section.

5. The control device for the steer-by-wire steering mechanism as claimed in claim 4, wherein in toe angle control using the target lateral forces outputted from the decelerating-time target lateral force output section, the toe angle control unit sets the toe angles increasingly toward toe-in sides in accordance with increase of the deceleration degree.

* * * * *